United States Patent
Honda et al.

(10) Patent No.: US 12,260,754 B2
(45) Date of Patent: Mar. 25, 2025

(54) PARKING MANAGEMENT DEVICE, VEHICLE, AND PARKING LOT MANAGEMENT METHOD

(71) Applicant: TOYOTA JIDOSHA KABUSHIKI KAISHA, Toyota (JP)

(72) Inventors: Daisaku Honda, Nagoya (JP); Hiroya Matsubayashi, Nisshin (JP); Ryota Tomizawa, Mishima (JP); Satoshi Tanabe, Susono (JP); Nobutsugu Maruiwa, Mishima (JP); Yasuhiro Kobatake, Nagoya (JP); Hiroki Awano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 14 days.

(21) Appl. No.: 18/136,042

(22) Filed: Apr. 18, 2023

(65) Prior Publication Data
US 2023/0419828 A1    Dec. 28, 2023

(30) Foreign Application Priority Data
Jun. 22, 2022    (JP) .................. 2022-100566

(51) Int. Cl.
*G08G 1/017* (2006.01)
*B60W 30/095* (2012.01)
(Continued)

(52) U.S. Cl.
CPC ... *G08G 1/096708* (2013.01); *B60W 30/0953* (2013.01); *B60W 30/0956* (2013.01);
(Continued)

(58) Field of Classification Search
CPC .. G08G 1/0116; G08G 1/096708; G08G 1/14; G08G 1/143; G08G 1/146; G08G 1/148; G08G 1/144; G08G 1/0112; G08G 1/0133; G08G 1/0141; G08G 1/04; G08G 1/09; G08G 1/096791; G08G 1/0969; G08G 1/142; G08G 1/16; G08G 1/161; G08G 1/163; G08G 1/166; G08G 1/167;
(Continued)

(56) References Cited

U.S. PATENT DOCUMENTS

2020/0074859 A1    3/2020 Eshima
2021/0348936 A1*   11/2021 Kondo .................. G08G 1/143
(Continued)

FOREIGN PATENT DOCUMENTS

JP    2007-019865 A    1/2007
JP    2020-035071 A    3/2020

*Primary Examiner* — Dionne Pendleton
(74) *Attorney, Agent, or Firm* — Sughrue Mion, PLLC

(57) ABSTRACT

A parking management device includes: a data acquiring unit configured to acquire user identification data for identifying the position of a user moving in a parking lot; a movement route estimating unit configured to estimate a movement route based on the user identification data acquired by the data acquiring unit, the movement route being a route along which the user moves in the parking lot; and a running route deciding unit configured to decide a running route of a vehicle so as to avoid the movement route estimated by the movement route estimating unit, the vehicle being a vehicle running in the parking lot.

8 Claims, 10 Drawing Sheets

(51) Int. Cl.
  *G01C 21/36* (2006.01)
  *G08G 1/01* (2006.01)
  *G08G 1/0967* (2006.01)
  *G08G 1/14* (2006.01)
  *H04W 4/46* (2018.01)
(52) U.S. Cl.
  CPC ............ *G08G 1/0116* (2013.01); *G08G 1/143* (2013.01); *G08G 1/146* (2013.01); *G08G 1/148* (2013.01); *H04W 4/46* (2018.02)
(58) Field of Classification Search
  CPC  G08G 1/20; G08G 1/205; G08G 9/02; G08G 1/141; H04W 4/027; H04W 4/06; H04W 4/46; H04W 4/48; H04W 56/0035; H04W 64/006; H04W 72/0446; H04W 72/30; H04W 74/0816; H04W 76/14; H04W 76/40; H04W 4/44; H04L 5/0091; H04J 3/1694; G06V 20/54; G06V 20/584; G06V 20/586; G06N 5/04; G05D 1/0088; G05D 1/0212; G05D 1/0278; G01S 5/0027; G01C 21/26; G01C 21/3658; G01C 21/3685; G01C 21/3822; B62D 15/0285; B60W 10/06; B60W 10/18; B60W 10/20; B60W 2556/50; B60W 50/14; B60R 2325/205; B60R 25/33; G06Q 10/02
  See application file for complete search history.

(56) References Cited

U.S. PATENT DOCUMENTS

2022/0032874 A1\* 2/2022 Hayakawa ............. G08G 1/144
2022/0250613 A1\* 8/2022 Iyer ....................... B60W 50/16
2023/0419834 A1\* 12/2023 Chiba .................... G08G 1/146

\* cited by examiner

PARKING MANAGEMENT DEVICE, VEHICLE, AND PARKING LOT MANAGEMENT METHOD

CROSS-REFERENCE TO RELATED APPLICATION

This application claims priority to Japanese Patent Application No. 2022-100566 filed on Jun. 22, 2022, incorporated herein by reference in its entirety.

BACKGROUND

1. Technical Field

The present disclosure relates to a parking management device, a vehicle, and a parking lot management method.

2. Description of Related Art

A device that manages a vehicle in a parking lot is known (for example, Japanese Unexamined Patent Application Publication No. 2007-19865).

SUMMARY

Conventionally, it is desirable to secure the safety of a user moving in a parking lot.

A first aspect of the present disclosure is a parking management device that manages a vehicle in a parking lot, the parking management device including: a data acquiring unit configured to acquire user identification data for identifying the position of a user moving in the parking lot; a movement route estimating unit configured to estimate a movement route based on the user identification data acquired by the data acquiring unit, the movement route being a route along which the user moves in the parking lot; and a running route deciding unit configured to decide a running route of the vehicle so as to avoid the movement route estimated by the movement route estimating unit, the vehicle being a vehicle running in the parking lot.

A second aspect of the present disclosure may be the parking management device according to the first aspect, further including a sending unit configured to send, to the vehicle running, the running route decided by the running route deciding unit, in which the vehicle running autonomously runs by automatic driving, in accordance with the received running route, or outputs navigation information that guides a driver along the received running route.

A third aspect of the present disclosure may be the parking management device according to the first or second aspect, in which as the user identification data, the data acquiring unit acquires imaging data generated when the user is imaged by an infrastructure sensor provided in the parking lot or a vehicle-exterior monitoring sensor provided in a vehicle in the parking lot, or acquires position information about a portable device that is held by the user, from the portable device.

A fourth aspect of the present disclosure may be the parking management device according to any one of the first to third aspects, in which: an installation available to the user is provided in the parking lot; and the movement route estimating unit estimates the movement route along which the user moves to the installation, based on position information about the installation, in addition to the user identification data.

A fifth aspect of the present disclosure may be the parking management device according to the fourth aspect, in which: a plurality of the installations is provided in the parking lot; and the movement route estimating unit estimates the movement route to the installation closest to the user. A sixth aspect of the present disclosure may be the parking management device according to the fourth or fifth aspect, in which the installation includes a gateway through which the user is capable of entering or leaving the parking lot.

A seventh aspect of the present disclosure may be the parking management device according to any one of the first to sixth aspects, in which: a running direction in which the vehicle runs is previously restricted in the parking lot; and the running route deciding unit selects one reference route from a plurality of reference routes that is previously set in accordance with the running direction, and decides that the running route is the one reference route, the one reference route being a route that allows avoidance of the movement route estimated by the movement route estimating unit.

An eighth aspect of the present disclosure may be the parking management device according to any one of the first to seventh aspects, in which: the movement route estimating unit estimates the respective movement routes of a plurality of the users; and the running route deciding unit obtains a plurality of candidates of the running route, calculates the number of crossing points between each of the plurality of obtained candidates and the plurality of movement routes estimated by the movement route estimating unit, and decides that the running route is one of the candidates, the one of the candidates being a candidate for which the calculated number is smallest.

A ninth aspect of the present disclosure may be the parking management device according to any one of the first to seventh aspects, further including a priority order giving unit configured to give a priority order to the user based on the user identification data acquired by the data acquiring unit, the priority order corresponding to a physical feature of the user, in which: the movement route estimating unit estimates the respective movement routes of a plurality of the users; and the running route deciding unit obtains a plurality of candidates of the running route, and decides that the running route is one of the plurality of obtained candidates, the one of the plurality of obtained candidates being a candidate that allows avoidance of the movement route of the user to which the highest priority order is given.

A tenth aspect of the present disclosure is a vehicle that autonomously runs by automatic driving, in accordance with the running route decided by the running route deciding unit of the parking management device according to any one of the first to ninth aspects, or outputs navigation information that guides a driver along the running route decided by the running route deciding unit of the parking management device according to any one of the first to ninth aspects.

An eleventh aspect of the present disclosure is a method for managing a vehicle in a parking lot, in which a processor executes: acquiring user identification data for identifying a position of a user moving in the parking lot; estimating a movement route based on the acquired user identification data, the movement route being a route along which the user moves in the parking lot; and deciding a running route of the vehicle so as to avoid the estimated movement route, the vehicle being a vehicle running in the parking lot.

With the present disclosure, it is possible to automatically acquire a safe running route that allows avoidance of contact between a vehicle running in a parking lot and a user moving in the parking lot. As a result, it is possible to enhance the safety of the user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
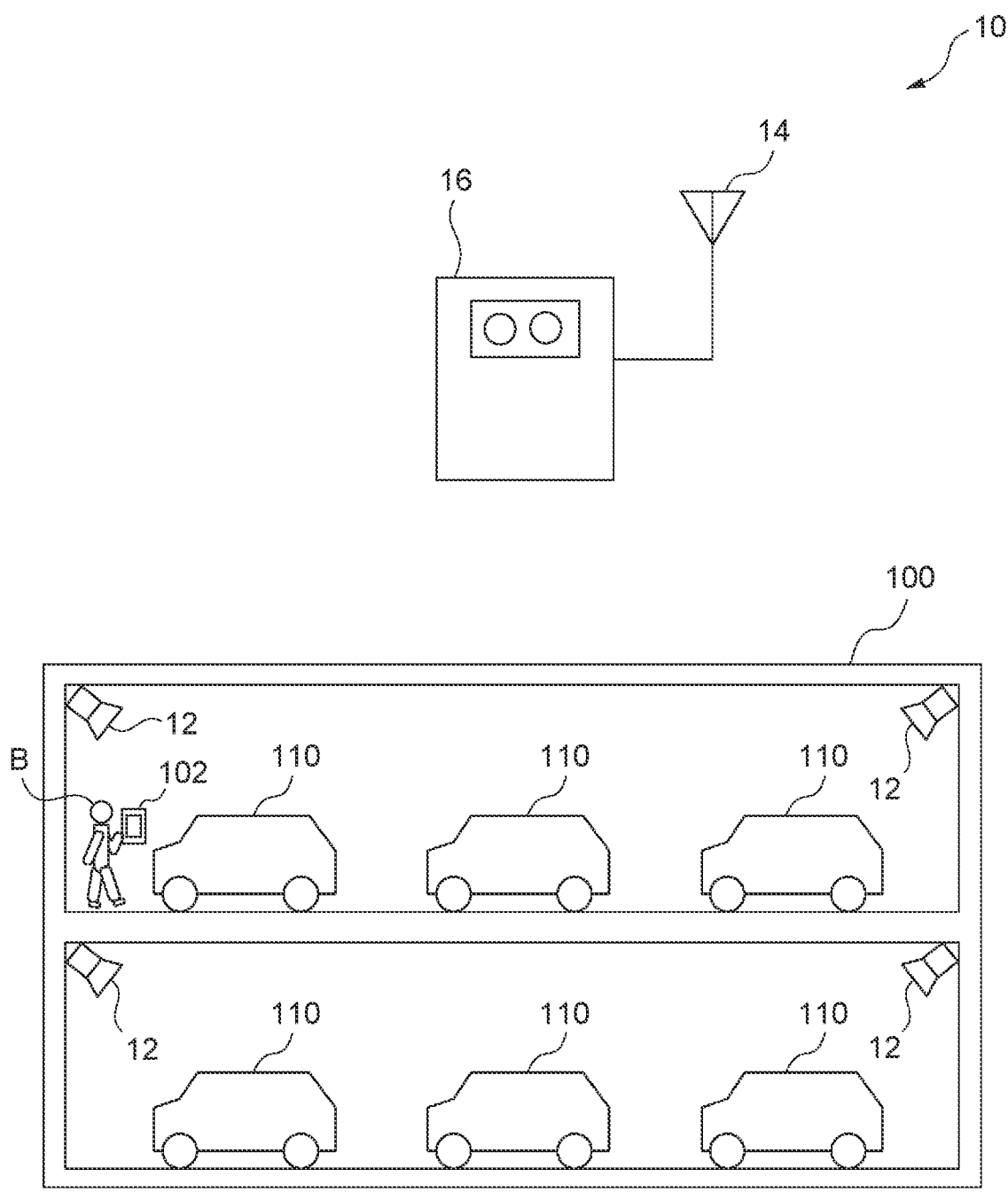
FIG. 1 is a schematic diagram showing a parking management system according to an embodiment, a parking lot, and vehicles.

Embodiments of the present disclosure will be described below in detail based on the drawings. In various embodiments described below, the same elements are denoted by the same reference characters, and repetitive descriptions are omitted. First, a parking management system 10 according to an embodiment will be described with reference to FIG. 1 and FIG. 2. The parking management system 10 is a system for managing vehicles 110 parked in a parking lot 100.

The parking management system 10 includes a plurality of infrastructure sensors 12, a communication device 14 and a parking management server 16. Each of the infrastructure sensors 12 includes a camera or a laser scanner or the like, and is provided in the parking lot 100. The infrastructure sensors 12 image physical bodies in the parking lot 100, as exemplified by parking spaces 106 demarcated in the parking lot 100, a user B moving in the parking lot 100, and vehicles 110 in the parking lot 100. The plurality of infrastructure sensors 12 may be installed so as to be dispersed at a plurality of spots in the parking lot 100, in order to image a physical body at an arbitrary position in the parking lot 100. The infrastructure sensor 12 supplies imaging data IM1 about the imaged physical body, to the parking management server 16.

The communication device 14 can perform data communication with the vehicle 110 in the parking lot 100 and an external communication device including a portable device 102 (a smartphone, a tablet terminal device or the like) that is held by the user B. Specifically, the communication device 14 sends and receives data with the vehicle 110 and the external communication device such as the portable device 102, by wireless, using a mobile communication network system such as 4G or 5G, for example. A plurality of communication devices 14 may be disposed so as to be dispersed in the parking lot 100, in order to communicate with the vehicle 110 or the portable device 102 at any position in the parking lot 100. Further, the communication device 14 may communicate with the external communication device, using any communication protocol.

Figure 2:
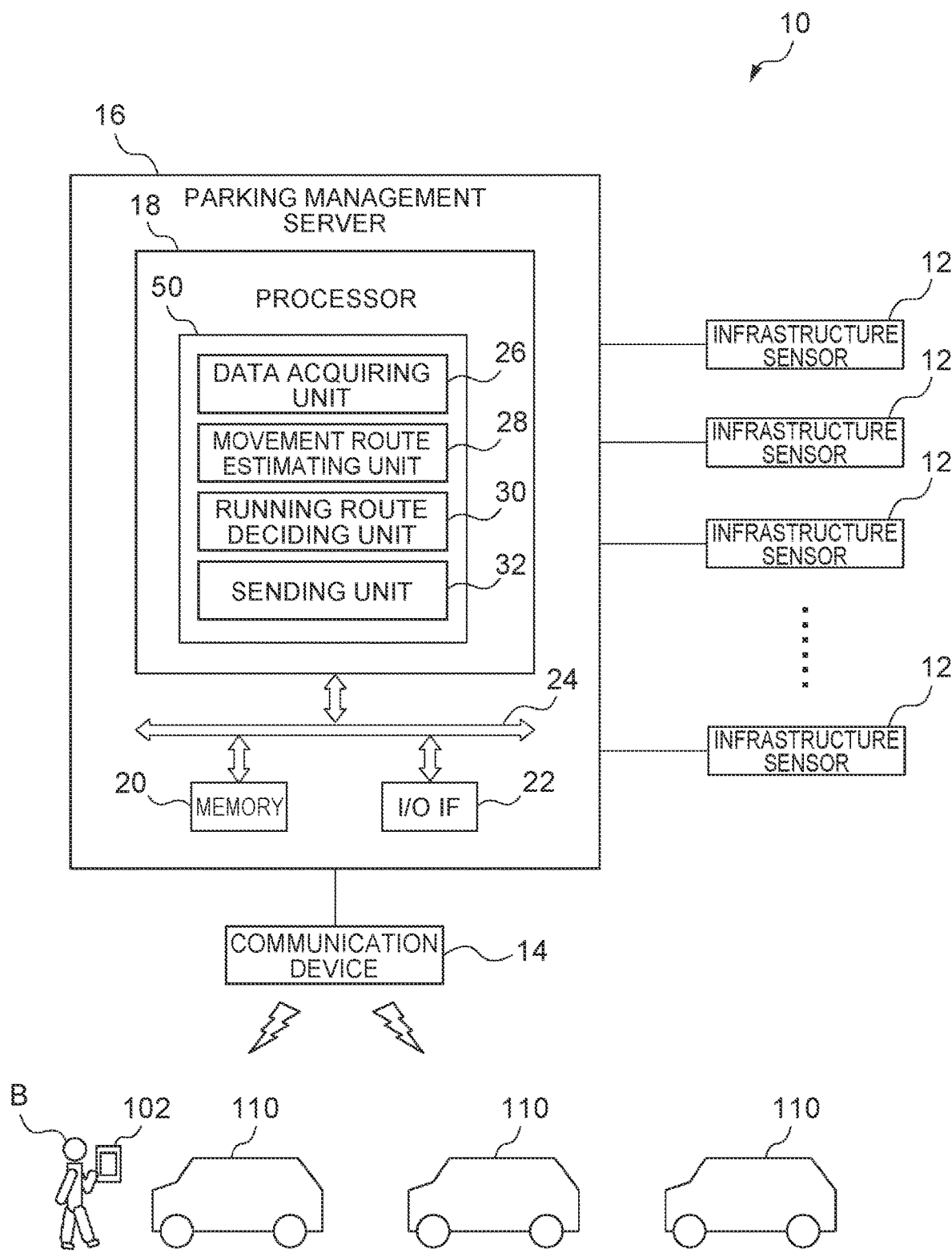
FIG. 2 is a block diagram of the parking management system shown in FIG. 1.

The parking management server 16 controls the operation of the infrastructure sensor 12 and the operation of the communication device 14. Specifically, as shown in FIG. 2, the parking management server 16 is a computer that includes a processor 18, a memory 20 and an I/O interface 22. The processor 18 includes a CPU, a GPU or the like, and is communicably connected with the memory 20 and the I/O interface 22 through a bus 24. The processor 18 performs arithmetic processing for realizing a parking management function described later.

The memory 20 includes a RAM, a ROM or the like, and temporarily or permanently stores a variety of data that is used in the arithmetic processing that is executed by the processor 18, and a variety of data that is generated in the middle of the arithmetic processing. For example, the I/O interface 22 includes an Ethernet (R) port, a USB port or a HDMI (R) terminal, and performs data communication with the infrastructure sensors 12 and external devices such as the communication device 14, by wire or by wireless.

Figure 3:
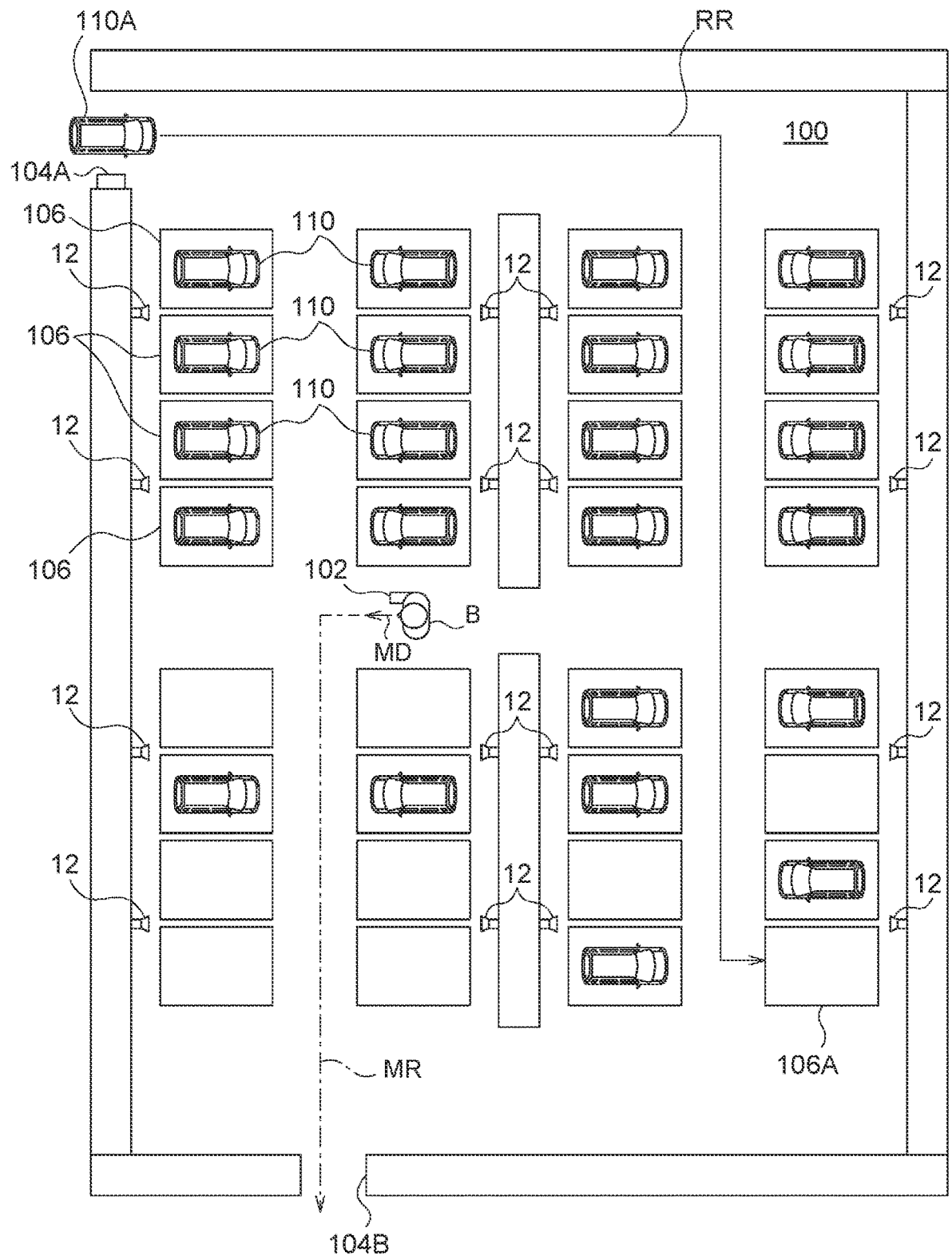
FIG. 3 is a diagram showing vehicles in the parking lot and a user moving in the parking lot.

In the parking lot 100, various installations 104 available to the user B are provided. Examples of the installation 104 include an entrance gate 104A of the parking lot 100 and a gateway 104B to the parking lot 100 as shown in FIG. 3. The user B can move in the parking lot 100 by foot or using a movement tool (a skateboard, a kickboard or the like), and can enter or leave the parking lot 100 through the gateway 104B.

The gateway 104B may be communicated with a gateway to a commercial facility (shopping mall or the like) adjacent to the parking lot 100. Further, the vehicle 110 can enter the parking lot 100 through the entrance gate 104A, and can be parked at one parking space 106 demarcated in the parking lot 100.

Figure 4:
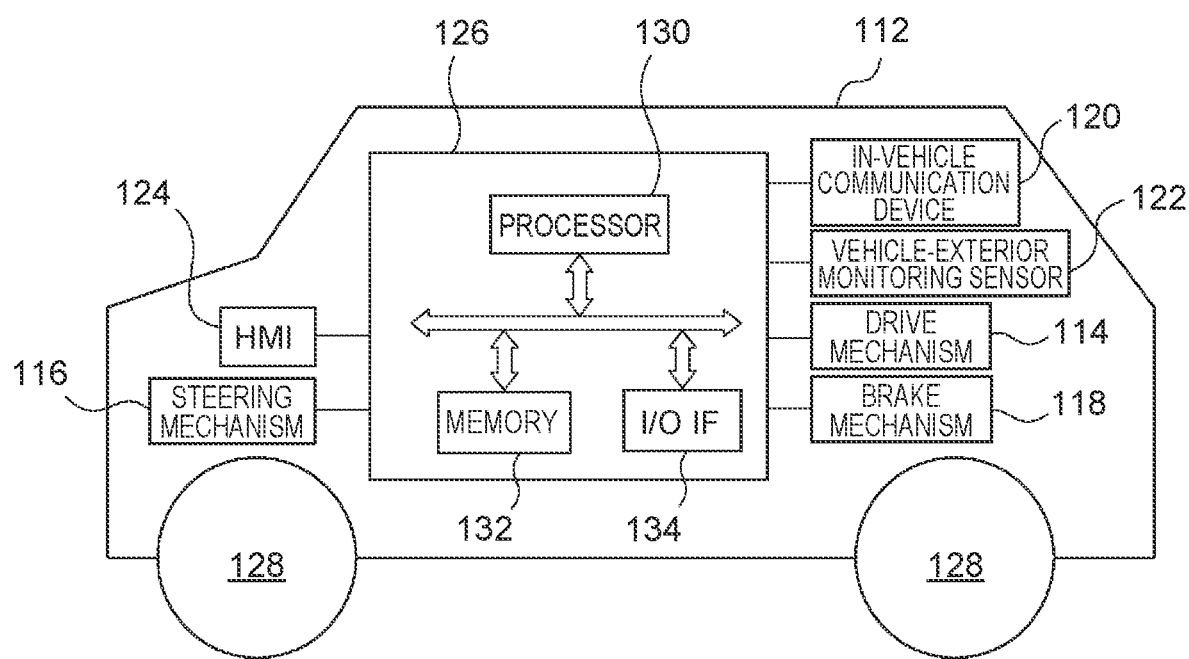
FIG. 4 is a block diagram of the vehicle shown in FIG. 3.

Next, the configuration of the vehicle 110 will be described with reference to FIG. 4. The vehicle 110 is a four-wheeled vehicle, for example, and includes a vehicle body 112, a drive mechanism 114, a steering mechanism 116, a brake mechanism 118, an in-vehicle communication device 120, a vehicle-exterior monitoring sensor 122, a human-machine interface (HMI) 124, an electronic control unit (ECU) 126, and the like.

The drive mechanism 114 includes an engine, an electric motor or the like, and generates drive force that causes the vehicle 110 to run, by driving and rotating wheels 128 rotatably provided on the vehicle body 112. The steering mechanism 116 includes a power steering device and the like, and automatically changes the running direction of the vehicle 110. The brake mechanism 118 includes an electric brake device and the like, and automatically brakes the vehicle 110 by giving braking force to the wheels 128.

The in-vehicle communication device 120 can communicate with external communication devices such as the communication device 14 of the parking management system 10. For example, the in-vehicle communication device 120 includes a GPS receiver 120A, an inter-vehicle communication device 120B and a data communication module (DCM) 120C. The GPS receiver 120A receives GPS signals from GPS satellites.

The inter-vehicle communication device 120B can send and receive data with an in-vehicle communication device of another vehicle. The DCM 120C can send and receive data with external communication devices (for example, the above-described communication device 14, a communication device provided in a management server of an automobile company, a communication base station, and the like) of the vehicle 110, using a mobile communication network system such as 4G or 5G.

For example, the vehicle-exterior monitoring sensor 122 includes at least one of a camera and a radar (a LiDAR, a laser scanner or the like), and images the surrounding environment of the vehicle 110. The HMI 124 exchanges information with a driver C of the vehicle 110. For example, the HMI 124 includes an input device (a switch, a push button, a rotary dial, a touch panel or the like) that accepts the input of information from the driver C, a display that displays a variety of information as an image, a speaker that outputs a variety of information as sound, and a microphone that converts the voice of the driver C into an electric signal.

The ECU 126 controls the operation of the vehicle 110. Specifically, the ECU 126 is a computer that includes a processor 130, a memory 132 and an I/O interface 134. The processor 130 includes a CPU, a GPU or the like, and is communicably connected with the memory 132 and the I/O interface 134 through a bus 136.

The memory 132 includes a RAM, a ROM or the like, and temporarily or permanently stores a variety of data that is used in arithmetic processing that is executed by the processor 130, and a variety of data that is generated in the middle of the arithmetic processing. For example, the I/O interface 134 includes a controller area network (CAN) port, an Ethernet (R) port, a USB port, an optical fiber connector, or an HDMI (R) terminal, and performs data communication with in-vehicle components such as the drive mechanism 114, the steering mechanism 116, the brake mechanism 118, the in-vehicle communication device 120, the vehicle-exterior monitoring sensor 122 and the HMI 124, by wire or by wireless.

In the embodiment, the driver C of each vehicle 110 previously performs a user registration for the parking lot 100, for using the parking lot 100. For example, by operating the human-machine interface (HMI) of the vehicle 110, the driver C accesses the parking management server 16 through the in-vehicle communication device 120 of the vehicle 110, downloads an application α for the user registration of the parking lot 100, from the parking management server 16, and installs the application α in the ECU 126 of the vehicle 110.

Then, by operating the HMI 124 of the vehicle 110, the driver C starts up the application α, inputs user information UF including personal information PR (for example, the name, the address, a telephone number and an ID number including a credit card number) about the driver C, and an automobile registration number NM, through a user registration screen displayed on the display of the HMI 124, and uploads the user information UF to the parking management server 16 through the in-vehicle communication device 120.

The processor 18 of the parking management server 16 gains the user information UF sent from the in-vehicle communication device 120 of the vehicle 110, through the communication device 14, and acquires a communication address AD1 (for example, an IP address) assigned to the in-vehicle communication device 120. Then, the processor 18 creates a database DB in which the gained user information UF (that is, the personal information PR and the automobile registration number NM) and address AD1 are contained in association with each other, and previously stores the database DB in the memory 20. Thus, before the use of the parking lot 100, the user information UF and address AD1 about a plurality of vehicles 110 are contained in the database DB.

On the other hand, the user B also previously performs a user registration for the parking lot 100, similarly. Specifically, by operating the portable device 102, the user B accesses the parking management server 16, downloads the above-described application α from the parking management server 16, and installs the application α in the portable device 102. By operating the portable device 102, the user B starts up the application α, inputs the personal information PR about the user B through a user registration screen displayed on a display of the portable device 102, and uploads the personal information PR from the portable device 102 to the parking management server 16.

The processor 18 of the parking management server 16 gains the personal information PR about the user B through the communication device 14, and acquires a communication address AD2 (for example, an IP address) assigned to the portable device 102. The processor 18 stores the gained personal information PR and address AD2 in the above-described database DB in association with each other.

As shown in FIG. 3, suppose that one vehicle 110A having performed the above-described user registration is about to enter the parking lot 100 through the entrance gate 104A and the user B is moving in the parking lot 100. The parking management system 10 according to the embodiment decides a running route RR along which the vehicle 110A runs in the parking lot 100, for avoiding the contact between the vehicle 110A running in the parking lot 100 and the user B moving in the parking lot 100.

Figure 5:
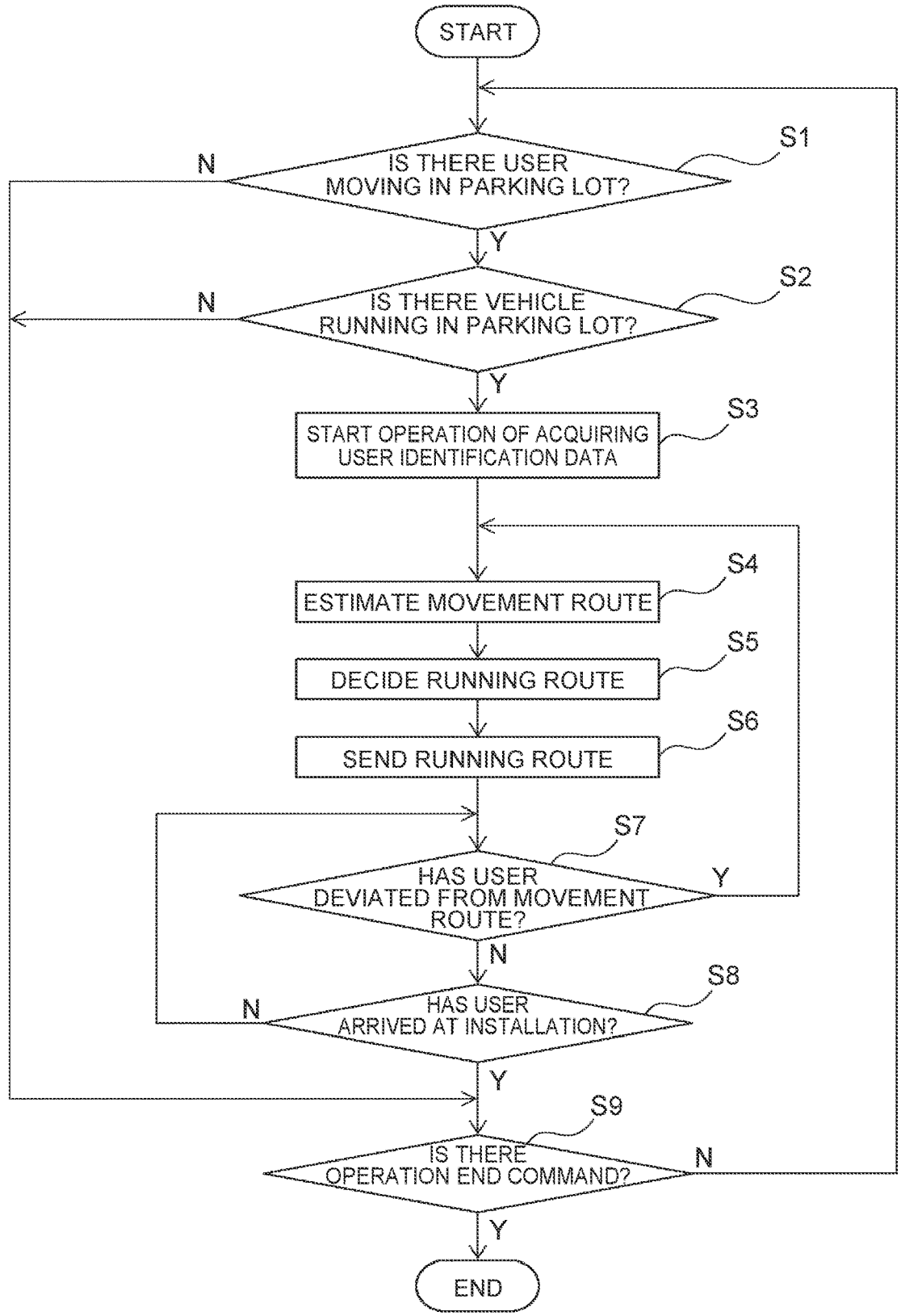
FIG. 5 is a flowchart showing an example of the operation flow of the parking management system shown in FIG. 1.

A function of the parking management system 10 will be described below with reference to FIG. 5. A flow shown in FIG. 5 is started when the processor 18 of the parking management server 16 accepts an operation start command from an operator, a management server of a management company for the parking lot 100, or a computer program PG.

In step S1, the processor 18 determines whether there is the user B moving in the parking lot 100. Specifically, the processor 18 analyzes the imaging data IM1 generated by the continuous imaging by the infrastructure sensors 12, and thereby determines whether there is the user B moving in the parking lot 100. In the case of the determination of YES, the processor 18 proceeds to step S2, and in the case of the determination of NO, the processor 18 proceeds to step S9.

In step S2, the processor 18 determines whether there is the vehicle 110 running in the parking lot 100. As an example, the processor 18 determines whether there is the vehicle 110 waiting at the entrance gate 104A, based on the imaging data IM1 generated by the imaging by a infrastructure sensor 12 that has a visual field containing the entrance gate 104A.

In the example shown in FIG. 3, the vehicle 110A waits at the entrance gate 104A. In this case, the vehicle 110A appears in the imaging data IM1 generated by the imaging by the infrastructure sensor 12 that has a visual field containing the entrance gate 104A. Consequently, by analyzing the imaging data IM1, the processor 18 can detect that the vehicle 110A waits at the entrance gate 104A.

In the case where the processor 18 detects that there is the vehicle 110A waiting at the entrance gate 104A, the processor 18 makes the determination of YES, and proceeds to step S3. On the other hand, in the case of the determination of NO, the processor 18 proceeds to step S9. When the processor 18 makes the determination of YES in step S2, the processor 18 reads an automobile registration number $NM_{110A}$ printed on a number plate of the vehicle 110A, from the imaging data IM1 generated when the infrastructure sensor 12 images the vehicle 110A.

Then, the processor 18 collates the read automobile registration number $NM_{110A}$ with the automobile registration numbers NM of a plurality of vehicles 110 contained in the above-described database DB, and thereby identifies the vehicle 110A contained in the database DB. As a result, the processor 18 can acquire the address AD1 of the in-vehicle communication device 120 equipped in the vehicle 110A, from the database DB.

In step S3, the processor 18 starts an operation of acquiring user identification data UD for identifying a position $P_B$ of the user B moving in the parking lot 100. As an example, the processor 18 acquires the imaging data IM1 generated when the infrastructure sensor 12 images the user B, as the user identification data UD.

The processor 18 can identify the position $P_B$ of the user B in the parking lot 100, based on position information PI1 in the parking lot 100 about the infrastructure sensor 12 having generated the imaging data IM1 in which the user B appears, a position where the user B appears in the imaging data IM1, and map data MP about the interior of the parking lot 100.

As another example, the processor 18 acquires imaging data IM2 generated when the vehicle-exterior monitoring sensor 122 provided in the vehicle 110 in the parking lot 100 images the user B, as the user identification data UD. As described above, the processor 18 reads the automobile registration number NM of the vehicle 110 that enters the parking lot 100, from the imaging data IM1 of the infrastructure sensor 12, and collates the automobile registration number NM with the database DB. Thereby, the processor 18 identifies the vehicle 110.

The processor 18 acquires the address AD1 of the identified vehicle 110 from the database DB, and sends a sensor actuation command to actuate the vehicle-exterior monitoring sensor 122 of the vehicle 110, to the in-vehicle communication device 120 of the vehicle 110. The processor 130 of the vehicle 110 actuates the vehicle-exterior monitoring sensor 122, in response to the sensor actuation command received through the in-vehicle communication device 120 (for example, the DCM 120C). As a result, the user B can be imaged by the vehicle-exterior monitoring sensor 122 of one of the vehicles 110 in the parking lot 100. The processor 130 sends the imaging data IM2 about the imaged user B to the parking management server 16 through the in-vehicle communication device 120 (DCM 120C).

The processor 18 of the parking management server 16 identifies the parking space 106 where the vehicle 110 is parked in the parking lot 100, based on the imaging data IM1 about the vehicle 110 imaged by the infrastructure sensor 12 after the entrance of the vehicle 110. Alternatively, the processor 130 of each vehicle 110 that enters the parking lot 100 may estimate its own position based on the GPS signals acquired through the GPS receiver 120A, and may send information PI2 about the estimated own position to the parking management server 16 through the in-vehicle communication device 120 (for example, the DCM 120C). Then, the processor 18 of the parking management server 16 may identify the parking space 106 where the vehicle 110 is parked, based on the position information PI2 about the vehicle 110 that is acquired through the communication device 14.

The processor 18 of the parking management server 16 can identify the position $P_B$ of the user B in the parking lot 100, based on the position information about the parking space 106 where the vehicle 110 equipped with the vehicle-exterior monitoring sensor 122 having generated the imaging data IM2 in which the user B appears is parked, the position where the user B appears in the imaging data IM2, and the above-described map data MP.

First, the processor 18 may identify the position $P_B$ of the user B, from the imaging data IM1 generated when the infrastructure sensor 12 images the user B, and next, may send the above-described sensor actuation command, to the vehicle 110 parked at a parking space 106 at the vicinity of the position $P_B$. In this case, it is possible to image the user B, by starting up the vehicle-exterior monitoring sensor 122 of the vehicle 110 parked at the vicinity of the position $P_B$ of the user B. Then, as the user identification data UD, the processor 18 acquires the imaging data IM1 generated when the infrastructure sensor 12 images the user B and the imaging data IM2 generated when the vehicle-exterior monitoring sensor 122 images the user B.

Furthermore, as another example, from the portable device 102 that is held by the user B, the processor 18 acquires position information PI3 about the portable device 102, as the user identification data UD. Specifically, the portable device 102 acquires coordinates in a maps application β such as Google map (R), and sends the coordinates to the parking management server 16 as the position information PI3. The processor 18 of the parking management server 16 can acquire the position information PI3 through the communication device 14, and can identify the position $P_B$ of the user B in the parking lot 100, based on the position information PI3 and the map data MP.

Thus, in step S3, the processor 18 starts the operation of acquiring the user identification data UD (specifically, the imaging data IM1, the imaging data IM2 or the position information PI3) for identifying the position $P_B$ of the user B moving in the parking lot 100. Accordingly, the processor 18 functions as a data acquiring unit 26 (FIG. 2) that acquires the user identification data UD.

After the start of step S3, the processor 18 acquires the user identification data UD continuously (for example, periodically). The processor 18 may collect at least two (for example, all) of the imaging data IM1, the imaging data IM2 and the position information PI3, as the user identification data UD.

In step S4, the processor 18 estimates a movement route MR along which the user B moves in the parking lot 100, based on the last acquired user identification data UD. The user B moving in the parking lot 100 is likely to move toward the gateway 104B. In the embodiment, the processor 18 estimates the movement route MR of the user B moving to the gateway 104B.

Specifically, whenever the processor 18 acquires the user identification data UD (that is, the imaging data IM1, the imaging data IM2 or the position information PI3), the processor 18 identifies the position $P_B$ of the user B in the parking lot 100, based on the user identification data UD. Then, the processor 18 estimates a movement direction MD of the user B based on a first position $P_{B\_n}$ identified for the last time and a second position $P_{B\_n-1}$ identified just before the first position $P_{B\_n}$.

The processor 18 acquires position information PI4 about the gateway 104B, from the map data MP about the interior of the parking lot 100. Then, the processor 18 estimates the movement route MR along which the user B moves to the gateway 104B, based on the estimated movement direction MD, the map data MP about the interior of the parking lot 100, and the position information PI4 about the gateway 104B. An example of the movement route MR estimated in this way is shown by a one-dot chain line in FIG. 3.

As shown in FIG. 3, the processor 18 estimates the movement route MR along which the user B can arrive at the gateway 104B in the shortest distance when the user B moves in the movement direction MD. In this way, in the embodiment, the processor 18 functions as a movement route estimating unit 28 (FIG. 2) that estimates the movement route MR based on the user identification data UD.

In step S5, the processor 18 decides the running route RR of the vehicle 110A running in the parking lot 100, so as to avoid the movement route MR estimated in the last step S4. Specifically, first, the processor 18 identifies an empty parking space 106 from the parking spaces 106 in the parking lot 100.

For example, the processor 18 can identify the empty parking space 106 based on the imaging data IM1 generated by the imaging by the infrastructure sensor 12. The infrastructure sensor 12 may include a vehicle detection sensor (for example, an infrared sensor) that can detect the vehicle 110 parked at each parking space 106, separately from the camera or the radar. In this case, the processor 18 may identify the empty parking space 106, based on detection data of the vehicle detection sensor.

From the map data MP about the interior of the parking lot 100, the processor 18 acquires position information PI5 about the identified empty parking space 106, and acquires position information PI6 about the entrance gate 104A. Then, the processor 18 decides the running route RR from the entrance gate 104A to the empty parking space 106, based on the movement route MR estimated in the last step S4, the position information PI5, PI6, and the map data MP.

An example of the running route RR decided in this way is shown by a solid line in FIG. 3. As shown in FIG. 3, the processor 18 decides the running route RR from the entrance gate 104A to the empty parking space 106A, such that the running route RR does not cross the movement route MR estimated in step S4. In this way, in the embodiment, the processor 18 functions as a running route deciding unit 30 (FIG. 2) that decides the running route RR. In the case where there is a plurality of empty parking spaces 106, the processor 18 may decide the running route RR from the gateway 104B (or the entrance gate 104A) to the parking space 106 closest to the gateway 104B (or the entrance gate 104A).

In step S6, the processor 18 sends the running route RR decided in the last step S5, to the vehicle 110A. Specifically, the processor 18 refers to the address AD1 of the vehicle 110A that is acquired when the determination of YES is made in step S2, and sends information about the running route RR decided in the last step S5, to the in-vehicle communication device 120 of the vehicle 110A, through the communication device 14. In this way, in the embodiment, the processor 18 functions as a sending unit 32 (FIG. 2) that sends the decided running route RR, to the vehicle 110A running in the parking lot 100.

The processor 130 of the vehicle 110A receives the information about the running route RR sent from the communication device 14, through the in-vehicle communication device 120 (DCM 120C). As an example, the vehicle 110A autonomously runs in the parking lot 100 by automatic driving, in accordance with the received running route RR. Specifically, the processor 130 performs the automatic control of the drive mechanism 114, steering mechanism 116 and brake mechanism 118 of the vehicle 110A, in accordance with the traveling route RR, and causes the vehicle 110A to autonomously run along the running route RR by automatic driving.

As another example, the processor 130 outputs navigation information NV that guides a driver C along the received traveling route RR. Specifically, the processor 130 generates image data or voice data as the navigation information NV about the guide along the running route RR, and outputs the image data or the voice data to the display or speaker of the HMI 124.

The driver C of the vehicle 110A can recognize a direction in which the driver C needs to cause the vehicle 110A to run, from an image (for example, an image in which the traveling direction of the vehicle 110A is indicated by a sign such as an arrow, or an image of the running route RR shown on the map data MP about the interior of the parking lot 100) that indicates the navigation information NV and that is displayed on the display of the HMI 124, or from the navigation information NV that is output as voice from the speaker of the HMI 124.

In step S7, the processor 18 determines whether the user B moving in the parking lot 100 has deviated from the movement route MR estimated in the last step S4. For example, when the movement direction MD of the user B has been reversed, the processor 18 determines that the user B has deviated from the movement route MR (that is, YES).

Alternatively, the processor 18 may make the determination of YES when the distance between the position $P_B$ of the user B and the movement route MR has become equal to or more than a predetermined threshold. In the case of the determination of YES, the processor 18 returns to step S4. On the other hand, in the case of the determination of NO, the processor 18 proceeds to step S8. Thus, whenever the processor 18 makes the determination of YES in step S7, the processor 18 executes steps S4 to S6 again.

Figure 6:
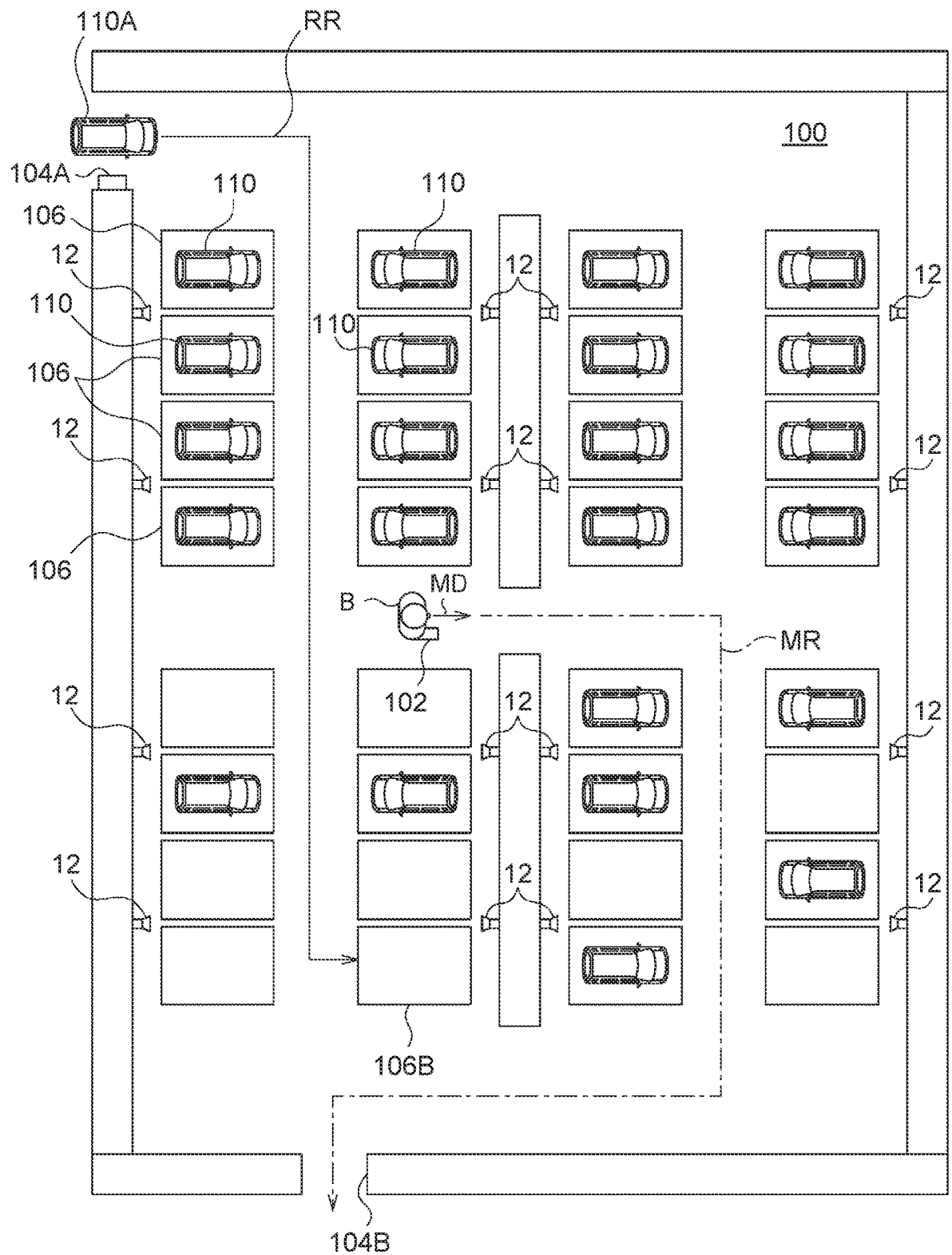
FIG. 6 shows a state where the user has reversed the movement direction in the parking lot shown in FIG. 3.

For example, in the case where the processor 18 makes the determination of YES in step S7 because the movement direction MD of the user B has been reversed as shown in FIG. 6, the processor 18 estimates the movement route MR shown in FIG. 6 again in step S4. Then, the processor 18 decides the running route RR toward to the empty parking space 106B again, so as to avoid the movement route MR estimated again, as shown in FIG. 6, in step S5, and sends the running route RR to the vehicle 110A again, in step S6.

In step S8, the processor 18 determines whether the user B has arrived at a desired installation 104 (specifically, the gateway 104B). For example, the processor 18 can determine whether the user B has arrived at the gateway 104B, based on the user identification data UD (that is, the imaging data IM1, the imaging data IM2 or the position information PI3). In the case of the determination of YES, the processor 18 proceeds to step S9. On the other hand, in the case of the determination of NO, the processor 18 returns to step S7.

In step S9, the processor 18 determines whether an operation end command (for example, a shutdown command) has been accepted from the operator, the management server of the management company for the parking lot 100, or the computer program PG. In the case of the determination of YES, the processor 18 ends the flow shown in FIG. 5. On the other hand, in the case of the determination of NO, the processor returns to step S1.

As described above, in the embodiment, the processor 18 functions as the data acquiring unit 26, the movement route estimating unit 28, the running route deciding unit 30 and the sending unit 32, and provides the running route RR that avoids the movement route MR of the user B, to the vehicle 110. Thereby, the processor 18 manages the vehicle 110 in the parking lot 100. Accordingly, the data acquiring unit 26, the movement route estimating unit 28, the running route deciding unit 30 and the sending unit 32 constitute a parking management device 50 (FIG. 2) that manages the vehicle 110 in the parking lot 100.

In the parking management device 50, the data acquiring unit 26 acquires the user identification data UD for identifying the position of the user B moving in the parking lot 100 (step S3), and the movement route estimating unit 28 estimates the movement route MR along which the user B moves in the parking lot 100, based on the user identification data UD acquired by the data acquiring unit 26 (step S4).

Then, the running route deciding unit 30 decides the running route RR of the vehicle 110A running in the parking lot 100, so as to avoid the movement route MR estimated by the movement route estimating unit 28 (step S5). With this configuration, it is possible to automatically provide the safe running route RR that allows the avoidance of the contact between the vehicle 110A running in the parking lot 100 and the user B moving in the parking lot 100. As a result, it is possible to enhance the safety of the user B.

Further, in the parking management device 50, the sending unit 32 sends the running route RR decided by the running route deciding unit 30, to the vehicle 110A (step S6). Then, as an example, the vehicle 110A autonomously runs in the parking lot 100 by automatic driving, in accordance with the received running route RR. With this configuration, it is possible to cause the vehicle 110A to autonomously run to the parking space 106A (or the parking space 106B), while surely avoiding the contact with the user B moving in the parking lot 100. Further, as another example, the vehicle 110A outputs the navigation information NV that guides the driver C along the received running route RR. With this configuration, the driver C of the vehicle 110A can easily recognize the safe running route RR that allows the avoidance of the contact with the user B.

Further, in the parking management device 50, as the user identification data UD, the data acquiring unit 26 acquires the imaging data IM1 generated when the user B is imaged by the infrastructure sensor 12 provided in the parking lot 100, the imaging data IM2 generated when the user B is imaged by the vehicle-exterior monitoring sensor 122 provided in the vehicle 110 in the parking lot 100, or the position information PI3 about the portable device 102 that is held by the user B. With this configuration, it is possible to accurately identify the position $P_B$ of the user B in the parking lot 100, and therefore, it is possible to accurately estimate the movement route MR of the user B.

Further, in the parking management device 50, the movement route estimating unit 28 estimates the movement route MR along which the user B moves to the installation 104 (specifically, the gateway 104B) provided in the parking lot 100, based on the position information PI4 about the installation 104, in addition to the user identification data UD. With this configuration, it is possible to accurately estimate the movement route MR along which the user B is likely to move, and therefore, it is possible to more effectively enhance the safety of the user B.

Next, another example of step S5 will be described with reference to FIG. 5 and FIG. 7. In the parking lot 100, a traveling direction DR (for example, one-way or no entry) in which the vehicle 110A runs after the entrance is previously restricted, in some cases. In the embodiment, a plurality of reference routes RFn (n=1, 2, 3, ...) along which the vehicle 110A can run from the entrance gate 104A to each parking space 106 is previously set in accordance with the traveling direction DR restricted in the parking lot 100.

Figure 7:
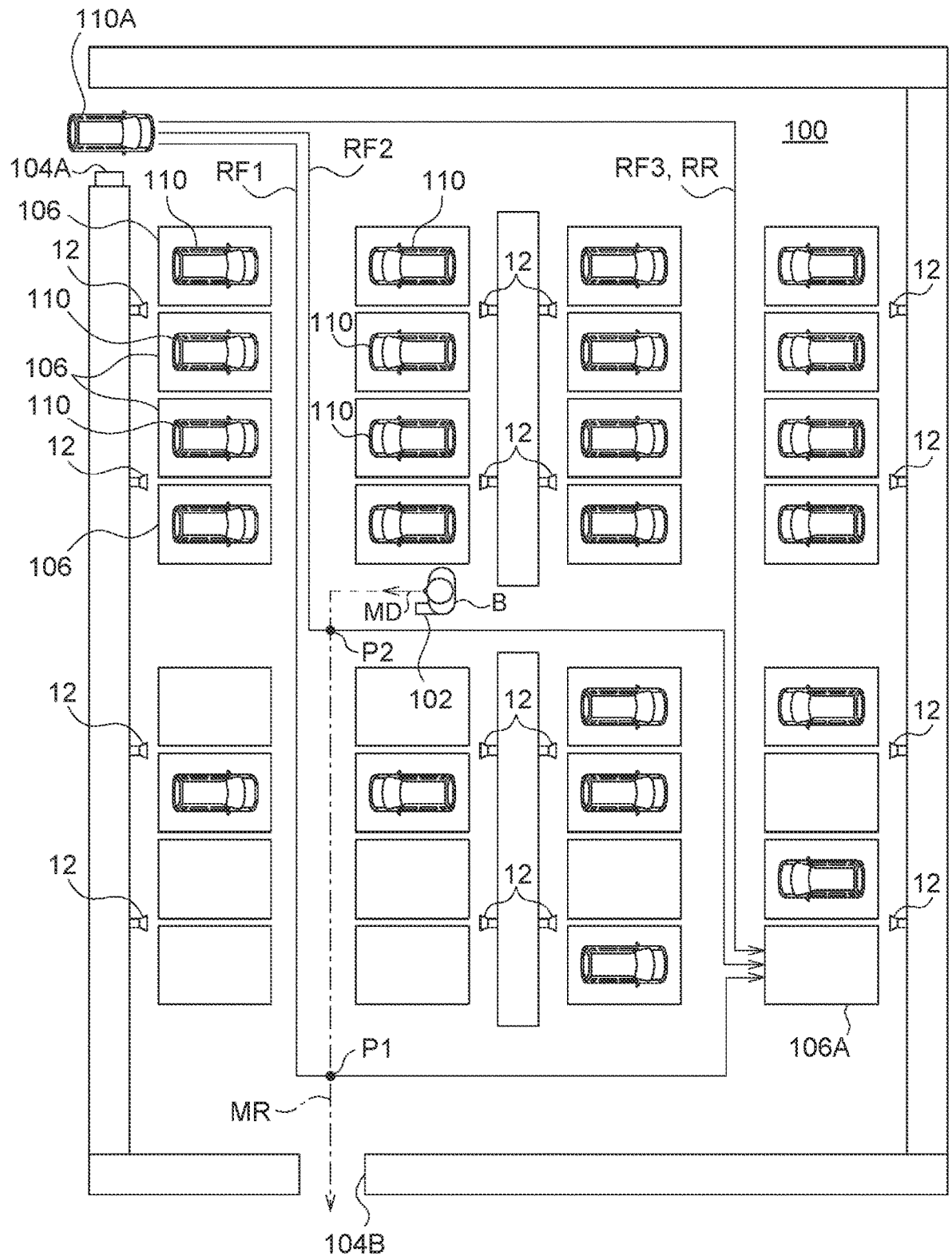
FIG. 7 is a diagram showing vehicles in the parking lot and the user moving in the parking lot.

For example, as shown in FIG. 7, three reference routes RF1, RF2, RF3 are previously set as the route from the entrance gate 104A to the empty parking space 106A, in accordance with the traveling direction DR. Information about the reference routes RF1, RF2, RF3 can be previously stored in the memory 20. In FIG. 7, to facilitate understanding, the reference routes RF1, RF2, RF3 are illustrated by solid lines that are away from each other over the whole range. However, it should be understood that the reference routes RF1, RF2, RF3 can overlap with each other in at least a partial range actually.

In the embodiment, in step S5, the processor 18 functions as the running route deciding unit 30, and reads the reference routes RF1, RF2, RF3 from the memory 20 after identifying the empty parking space 106A as described above. Then, the processor 18 obtains a crossing point P between each of the read reference routes RF1, RF2, RF3 and the movement route MR estimated in the last step S4. In the example shown in FIG. 7, the reference route RF1 crosses the movement route MR at a crossing point P1, and the reference route RF2 crosses the movement route MR at a crossing point P2. The reference route RF3 does not cross the movement route MR.

In this case, as the reference route RFn that allows the avoidance of the movement route MR, the processor 18 selects the reference route RF3 from the plurality of reference routes RF1, RF2, RF3. Then, the processor 18 decides that the running route RR of the vehicle 110A is the selected reference route RF3.

In this way, in the embodiment, the running route deciding unit 30 selects one reference route RF3 that allows the avoidance of the movement route MR estimated by the movement route estimating unit 28, from the plurality of reference routes RF1, RF2, RF3 previously set in accordance with the traveling direction DR, and decides that the running route RR is the reference route RF3. With this configuration, it is possible to automatically decide the running route RR that allows the avoidance of the movement route MR, while conforming to the traveling direction DR restricted in the parking lot 100.

Figure 8:
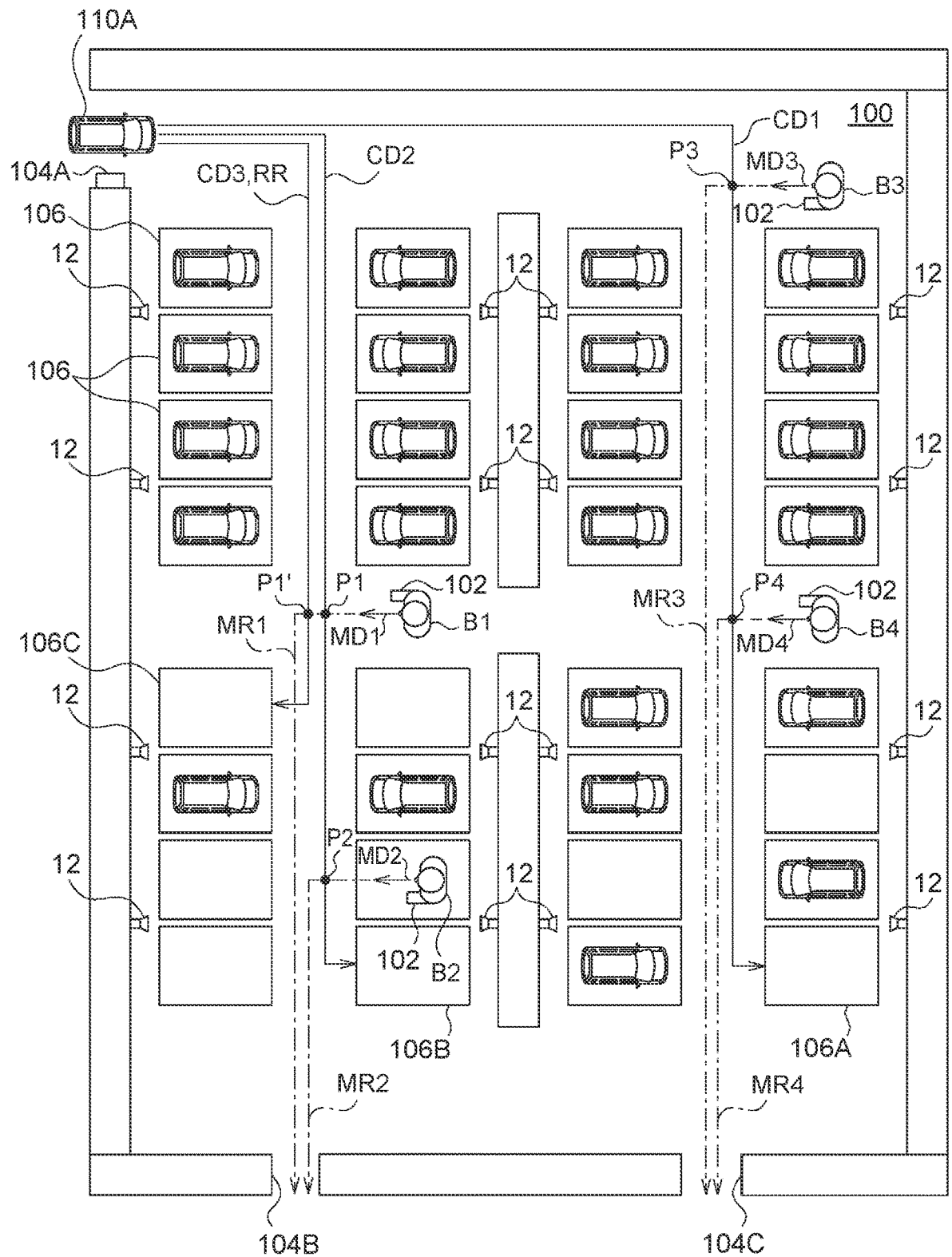
FIG. 8 is a diagram showing vehicles in the parking lot and a plurality of users moving in the parking lot.

Next, another example of steps S4 and S5 will be described with reference to FIG. 5 and FIG. 8. In the embodiment, as the installation 104, a plurality of gateways 104B, 104C is provided in the parking lot 100, as shown in FIG. 8. Further, a plurality of users B1, B2, B3, B4 moves in the parking lot 100.

In the embodiment, in step S4, the processor 18 functions as the movement route estimating unit 28, and estimates movement routes MR1, MR2, MR3, MR4 along which the plurality of users B1, B2, B3, B4 moves in the parking lot 100, based on the last acquired user identification data UD.

Specifically, for the user B1, the processor 18 identifies a position $P_{B1}$ of the user B1 in the parking lot 100, based on the user identification data UD acquired in the start of step S1, that is, based on the imaging data IM1 or IM2 in which the user B1 is imaged, or the position information PI3 about the portable device 102 that is held by the user B1. Then, the processor 18 estimates a movement direction MD1 of the user B1 based on a first position $P_{B1\_n}$ identified for the last time and a second position $P_{B1\_n-1}$ identified just before the first position $P_{B1\_n}$.

The processor 18 acquires the position information PI4 about the gateway 104B and the position information PI4 about the gateway 104C, from the map data MP about the interior of the parking lot 100. In the embodiment, the processor 18 estimates the movement route MR1 from the user B1 to the gateway 104B closest to the user B1.

In the example shown in FIG. 8, the gateway that is of the plurality of gateways 104B, 104C and that is closest to the users B1, B2 is the gateway 104B. Consequently, as shown in FIG. 8, the processor 18 estimates the movement route MR1 along which the user B1 moves to the gateway 104B closest to the user B1, based on the estimated movement direction MD1, the map data MP, and the position information PI4 about the gateways 104B, 104C.

Similarly, for the user B2, the processor 18 identifies a position $P_{B2}$ of the user B2 in the parking lot 100, based on the imaging data IM1 or IM2 in which the user B2 is imaged, or the position information PI3 about the portable device 102 that is held by the user B2. Then, the processor 18 estimates a movement direction MD2 of the user B2 based on a first position $P_{B2\_n}$ identified for the last time and a second position $P_{B2\_n-1}$ identified just before the first position $P_{B2\_n}$. Then, the processor 18 estimates the movement route MR2 along which the user B2 moves to the gateway 104B closest to the user B2, based on the movement direction MD2, the map data MP, and the position information PI4 about the gateways 104B, 104C.

For the users B3, B4, the gateway that is of the gateways 104B, 104C and that is closest to the users B3, B4 is the gateway 104C. Consequently, by the same method as the method for the users B1, B2, the processor 18 estimates the movement route MR3 along which the user B3 moves to the gateway 104C and the movement route MR4 along which the user B4 moves to the gateway 104C.

In step S5, the processor 18 functions as the running route deciding unit 30, and decides the running route RR of the vehicle 110A running in the parking lot 100, so as to avoid the movement routes MR1, MR2, MR3, MR4 estimated in the last step S4. Specifically, first, the processor 18 identifies a plurality of empty parking spaces 106A, 106B, 106C, from the parking spaces 106 in the parking lot 100, as shown in FIG. 8.

In the example shown in FIG. 8, to facilitate understanding, three parking spaces 106A, 106B, 106C are identified as the empty parking space 106. However, any parking space 106 other than the parking spaces 106A, 106B, 106C may be identified, or all empty parking spaces 106 may be identified.

Then, the processor 18 obtains a candidate CD1 of the running route RR from the entrance gate 104A to the parking space 106A, based on the position information PI5 about the identified empty parking space 106A, the position information PI6 about the entrance gate 104A and the map data MP. Similarly, the processor 18 obtains a candidate CD2 of the running route RR from the entrance gate 104A to the parking space 106B and a candidate CD3 of the running route RR from the entrance gate 104A to the parking space 106C.

Then, the processor 18 obtains crossing points P between each of the obtained candidates CD1, CD2, CD3 and the plurality of movement routes MR1, MR2, MR3 MR4 estimated in the last step S4. In the example shown in FIG. 8, the candidate CD1 crosses the movement route MR3 of the user B3 at a crossing point P3, and crosses the movement route MR4 of the user B4 at a crossing point P4. In this case, the processor 18 calculates that the number $\upsilon 1$ of the crossing points P3, P4 between the candidate CD1 and the plurality of movement routes MRn (n=1, 2, 3, 4) is $\upsilon 1 = 2$.

Further, the candidate CD2 crosses the movement route MR1 of the user B1 at a crossing point P1, and crosses the movement route MR2 of the user B2 at a crossing point P2. Consequently, the processor 18 calculates that the number $\upsilon 2$ of the crossing points P1, P2 between the candidate CD2 and the plurality of movement routes MRn is $\upsilon 2 = 2$. The candidate CD3 crosses the movement route MR1 of the user B1 at a crossing point P1'. Consequently, the processor 18 calculates that the number $\upsilon 3$ of the crossing point P1' between the candidate CD3 and the plurality of movement routes MRn is $\upsilon 3 = 1$.

That is, in the example shown in FIG. 8, among the plurality of obtained candidates CD1, CD2, CD3, the candidate CD3 minimizes the number $\upsilon$ of crossing points P with the movement routes MRn (because of $\upsilon 3 = 1$). In step S5, the processor 18 decides that the running route RR of the vehicle 110A is the candidate CD3 that minimizes the number $\upsilon$ of crossing points P. Thus, the processor 18 functions as the running route deciding unit 30, and decides that the running route RR is the candidate CD3 that maximally allows the avoidance of the plurality of movement routes MRn among the candidates CD1, CD2, CD3.

After step S5, the processor 18 sends the running route RR to the vehicle 110A, in step S6, and determines whether the users B1, B2, B3, B4 have deviated from the movement routes MRn, in step S7. In step S7, the processor 18 makes the determination of YES, in the case where at least one of the users B1, B2, B3, B4 has deviated from the movement routes MRn. In step S8, the processor 18 determines whether all users B1, B2, B3, B4 have arrived at the installation 104 (that is, the gateway 104B or the gateway 104C).

As described above, in the embodiment, the movement route estimating unit 28 estimates the movement routes MR1, MR2, MR3, MR4 from the users B1, B2, B3, B4 to the installation 104 (specifically, the gateway 104B or the gateway 104C) closest to the users B1, B2, B3, B4 (step S4). With this configuration, it is possible to minimize distances by which the users B1, B2, B3, B4 move to desired installations 104, and therefore, it is possible to enhance convenience for the users B1, B2, B3, B4.

Further, in the embodiment, the movement route estimating unit 28 estimates the respective movement routes MR1, MR2, MR3, MR4 of the plurality of users B1, B2, B3, B4 (step S4). Then, the running route deciding unit 30 obtains the plurality of candidates CD1, CD2, CD3 of the running route RR, and calculates the number $\upsilon 1$, $\upsilon 2$, $\upsilon 3$ of the crossing points P1, P1', P2, P3, P4 between each of the obtained candidates CD1, CD2, CD3 and the movement routes MR1, MR2, MR3, MR4 estimated by the movement route estimating unit 28.

Then, the running route deciding unit 30 decides that the running route RR is the one candidate CD3 for which the calculated number $\upsilon 1$, $\upsilon 2$, $\upsilon 3$ is smallest. With this configuration, in the case where the plurality of users B1, B2, B3, B4 moves in the parking lot 100, it is possible to maximally avoid the users B1, B2, B3, B4 from coming in contact with the vehicle 110A.

In the embodiment, when the processor 18 decides that the running route RR is the candidate CD3 in step S5, the processor 18 may send driving control information CI about the vehicle 110A to the vehicle 110A, together with the information about the running route RR, in step S6. The driving control information CI is information for controlling the driving of the vehicle 110A such that there is a time lag between a time t1 when the vehicle 110A running in accordance with the running route RR arrives at the crossing point P1' and a time t2 when the user B1 arrives at the crossing point P1'. For example, the driving control information CI may include information for decelerating (for example, stopping) or accelerating the vehicle 110A before the arrival at the crossing point P1' when the vehicle 110A runs along the running route RR.

Then, when the vehicle 110A autonomously runs in the parking lot 100 by automatic driving in accordance with the running route RR sent in step S6, the processor 130 of the vehicle 110A may perform the automatic control of the drive mechanism 114 or the brake mechanism 118, so as to decelerate or accelerate the vehicle 110A short of the crossing point P1' in accordance with the driving control information CI sent together with the running route RR.

Alternatively, the processor 130 of the vehicle 110A may output, through the HMI 124, navigation information NV' that guides the driver C about the driving control information CI (that is, the timing of the deceleration or acceleration of the vehicle 110A). With this configuration, it is possible to surely avoid the contact between the vehicle 110A running along the running route RR and the user B1.

Figure 9:
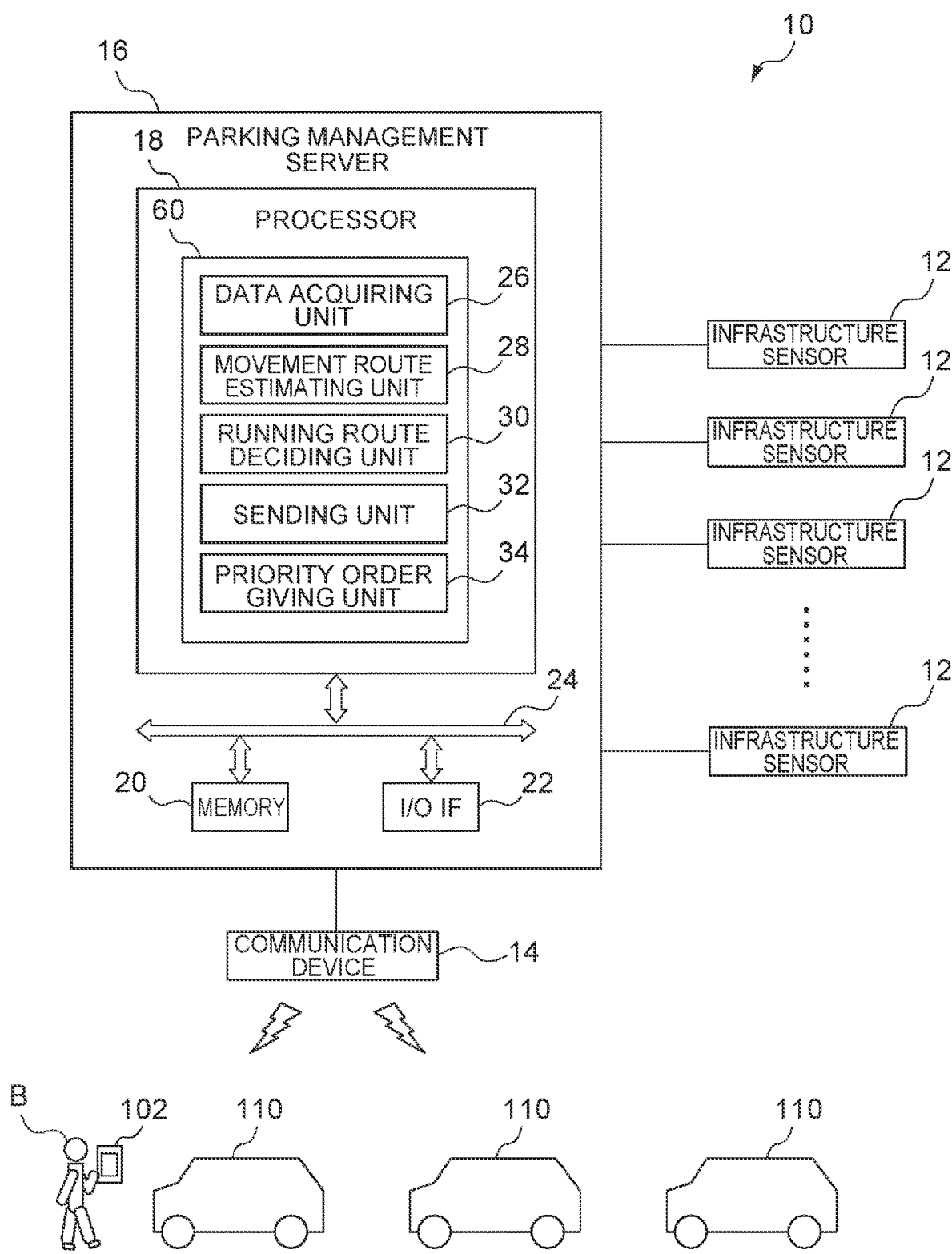
FIG. 9 is a block diagram showing another function of the parking management system.

Next, another function of the parking management system 10 will be described with reference to FIG. 9 and FIG. 10. In the embodiment, the processor 18 of the parking management server 16 executes a flow shown in FIG. 10. In the flow shown in FIG. 10, the same processes as those in the flow in FIG. 5 are denoted by the same step numbers, and repetitive descriptions are omitted.

After step S3, in step S11, the processor 18 gives a priority order OR corresponding to the physical feature of the user B, to the user B, based on the user identification data UD. For example, in the case where the user B is a child, an elderly person or a physically handicapped person, it is necessary to preferentially avoid the contact with the vehicle 110A. Whether the user B is a preferentially protected person such as a child, an elderly person or a physically handicapped person can be determined depending on the physical feature (the physical height, the physical size, the motion of the body, and the like) of the user B.

Hence, in the embodiment, the processor 18 gives a high priority order OR to the user B that needs to preferentially avoid the contact with the vehicle 110A, depending on the physical feature of the user B. Step S11 will be described below with reference to FIG. 8. In the embodiment, suppose that the user B1 is a preferentially protected person among the plurality of users B1, B2, B3, B4 shown in FIG. 8.

After the start of step S1, the processor 18 collects the imaging data IM1, IM2 in which the users B1, B2, B3, B4 are imaged, as the user identification data UD, and analyzes the imaging data IM1, IM2. Thereby, the processor 18 determines whether the users B1, B2, B3, B4 are preferentially protected persons.

For example, the processor 18 may determine whether the users B1, B2, B3, B4 appearing in the imaging data IM1, IM2 collected by the processor 18 are preferentially protected persons, using a machine learning model LM (or an algorithm of an AI: artificial intelligence) indicating the correlativity between the imaging data IM in which an arbitrary person is imaged and whether the physical feature of the person appearing in the imaging data IM corresponds to a preferentially protected person.

For example, the machine learning model LM can be generated by repeatedly giving the imaging data IM and determination data indicating whether the physical feature of the person appearing in the imaging data IM corresponds to a preferentially protected person, to a machine learning device, as a learning data set (for example, by supervised learning). The processor 18 may be configured to execute the function of the machine learning device, and to generate the machine learning model LM. The generated machine learning model LM may be previously contained in the memory 20.

The processor 18 serially inputs the imaging data IM1, IM2 collected after the start of step S1, to the machine learning model LM. From the input imaging data IM1, IM2, the machine learning model LM outputs determination result data indicating whether the users B1, B2, B3, B4 appearing in the imaging data IM1, IM2 are preferentially protected persons.

From the determination result data output by the machine learning model LM, the processor 18 can determine whether the users B1, B2, B3, B4 are preferentially protected persons. As a result, the processor 18 determines that the users B2, B3, B4 are not preferentially protected persons, and determines that the user B1 is a preferentially protected person.

Then, in step S11, the processor 18 gives a highest priority order OR1 to the user B1 that is determined to be a preferentially protected person, and monitors the user B1 as a preferentially protected person. In this way, in the embodiment, the processor 18 functions as a priority order giving unit 34 (FIG. 9) that gives the priority order OR1 corresponding to the physical feature of the user B1, to the user B1, based on the user identification data UD.

After step S11, in step S4, the processor 18 functions as the movement route estimating unit 28, and estimates the respective movement routes MR1, MR2, MR3, MR4 of the plurality of users B1, B2, B3, B4, similarly to the above embodiment described with reference to FIG. 8.

Subsequently, in step S5, the processor 18 functions as the running route deciding unit 30, and obtains the plurality of candidates CD1, CD2, CD3 of the running route RR, similarly to the above embodiment described with reference to FIG. 8. Then, the processor 18 selects one candidate CD that allows the avoidance of the movement route MR1 of the user B1 to which the highest priority order OR1 is given in step S11, from the obtained candidates CD1, CD2, CD3, and decides that the running route RR of the vehicle 110A is the selected candidate CD.

In the case of the example shown in FIG. 8, the candidates CD2, CD3 cross the movement route MR1 of the user B1 at the crossing points P1, P2 and at the crossing point P1', respectively. On the other hand, the candidate CD1 does not cross the movement route MR1. Accordingly, in this case, the processor 18 decides that the running route RR of the vehicle 110A is the candidate CD1.

As described above, in the embodiment, the processor 18 functions as the data acquiring unit 26, the movement route estimating unit 28, the running route deciding unit 30, the sending unit 32 and the priority order giving unit 34. The processor 18 provides the running route RR that avoids the movement route MR1 of the user B1, to the vehicle 110, and thereby manages the vehicle 110 in the parking lot 100. Accordingly, the data acquiring unit 26, the movement route estimating unit 28, the running route deciding unit 30, the sending unit 32 and the priority order giving unit 34 constitute a parking management device 60 (FIG. 9) that manages the vehicle 110 in the parking lot 100.

In the parking management device 60, the priority order giving unit 34 gives the priority order OR corresponding to the physical feature of the user B, to the user B, based on the user identification data UD (specifically, the imaging data IM1, IM2) acquired by the data acquiring unit 26. Then, the running route deciding unit 30 selects the one candidate CD1 that allows the avoidance of the movement route MR1 of the user B1 to which the highest priority order OR is given, from the plurality of obtained candidates CD1, CD2, CD3, and decides that the running route RR is the candidate CD1. With this configuration, it is possible to surely avoid the contact between the user B1 that needs to be preferentially protected and the vehicle 110A, and therefore, it is possible to enhance the safety of the user B1 that is a preferentially protected person.

In the above-described step S11, the processor 18 functions as the priority order giving unit 34, and may give priority orders OR different from each other, to a child, an elderly person, a physically handicapped person, and an adult healthy person. For example, the priority order OR1 as the first order (that is, the highest order) may be given to the physically handicapped person, a priority order OR2 as the second order may be given to the child, a priority order OR3 as the third order may be given to the elderly person, and a priority order OR4 as the fourth order may be given to the adult healthy person.

Further, there can be a case where the priority order OR1 as the highest order is given to a plurality of users B (that is, preferentially protected persons) and where the movement routes MR of the users B cross each of a plurality of obtained candidates CD. In this case, in step S5, the processor 18 may calculate the number υ of crossing points P between each of the candidates CD and the movement routes MR of the plurality of users B to which the priority order OR1 is given, and may decide that the running route RR is one candidate CD for which the calculated number υ is smallest, similarly to the above embodiment described with reference to FIG. 8.

Further, there can be a case where a plurality of candidates CD does not cross the movement route MR of the user B to which the priority order OR1 as the highest order is given. In this case, in step S5, the processor 18 may calculate the number υ of crossing points P between each of the candidates CD that do not cross the movement route MR of the user B to which the priority order OR1 is given and the movement routes MR of users B to which second or lower priority orders OR are given (or users B to which the priority order OR is not given), and may decide that the running route RR is one candidate CD for which the calculated number υ is smallest.

In the above-described step S11, the processor 18 gives the priority order OR to the user B, based on the imaging data IM1, IM2 acquired as the user identification data UD. However, the processor 18 may give the priority order OR to the users B1, B2, B3, B4, based on the acquired user identification data UD, that is, based on the position information PI3 about the respective portable devices 102 held by the users B1, B2, B3, B4. For example, in the case of an elderly person or a physically handicapped person, the movement speed of the body is likely to be low. Consequently, the processor 18 can determine whether the users B1, B2, B3, B4 are preferentially protected persons, based on the position information PI3.

In the above-described embodiment, a plurality of guide devices GD that guides the user B (B1, B2, B3, B4) along the movement route MR estimated by the processor 18 in step S4 may be provided in the parking lot 100. The guide device GD includes a display device (a digital signage or the like), a speaker or the like, and can be installed on a wall surface or roadway of a building of the parking lot 100. The guide device GD displays the movement route MR estimated by the processor 18, as an image including a sign such as an arrow, or guides the user B by voice. Thereby, the user B can easily recognize a pathway to a desired installation 104 (the gateway 104B or the gateway 104C).

Figure 10:
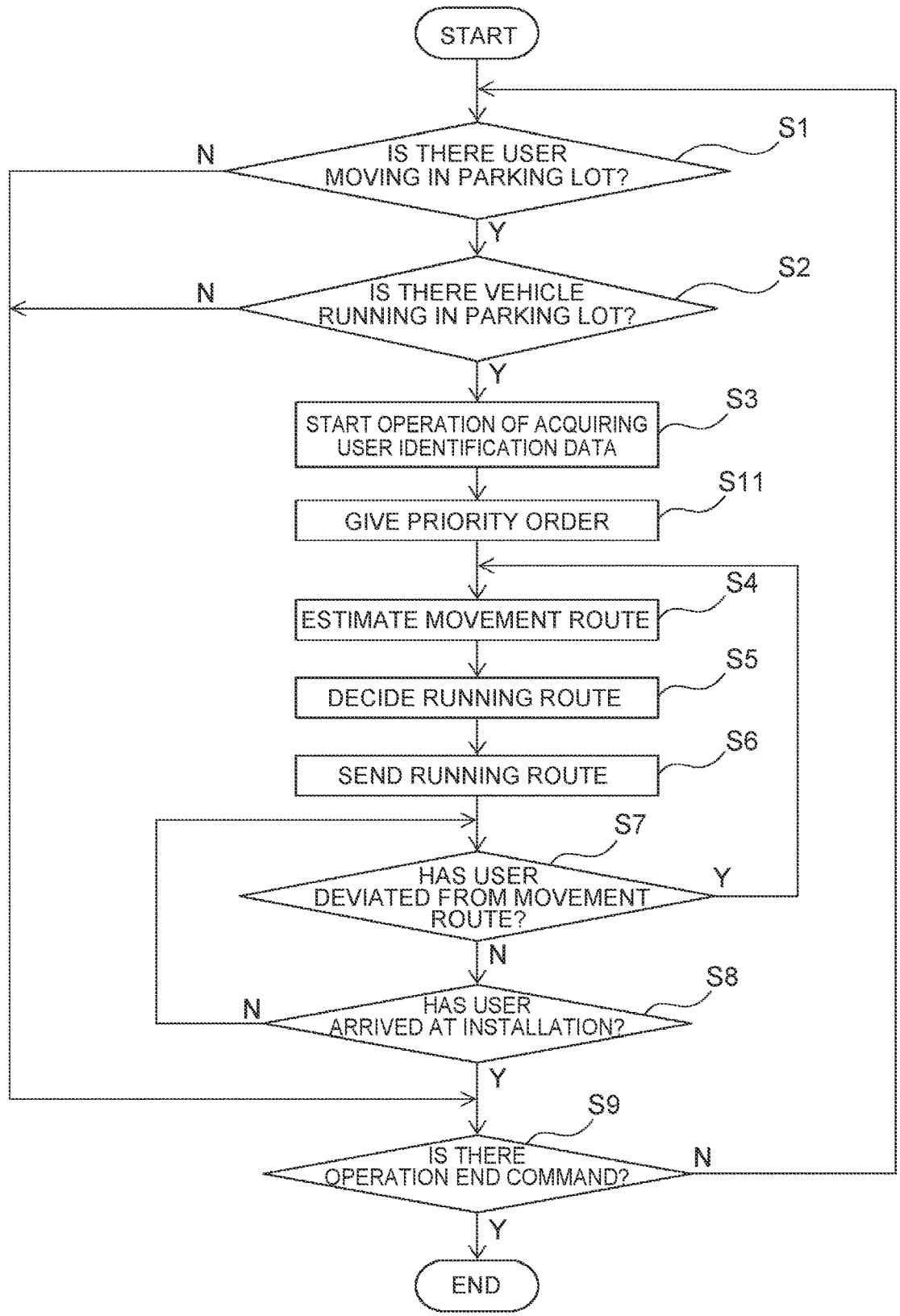
FIG. 10 is a flowchart showing an example of the operation flow of the parking management system shown in FIG. 9.

Further, step S6 can be excluded from the flow in FIG. 5 or FIG. 10. In this case, the processor 18 may display the running route RR decided in step S5, on the above-described guide device GD. In this case, the sending unit 32 can be excluded from the parking management device 50 or parking management device 60.

Further, in the above-described embodiment, the processor 18 may send an illumination lighting command to the vehicle 110 parked at the vicinity of the movement route MR estimated in step S4, and may start up an illumination device (a headlamp, a fog lamp, a turn signal or the like) of the vehicle 110. The processor 18 identifies the parking space 106 where the vehicle 110 is parked in the parking lot 100, as described above, and therefore can identify the vehicle 110 parked at the parking space 106 at the vicinity of the movement route MR estimated in step S4.

The processor 18 acquires the address AD1 of each identified vehicle 110 parked at the vicinity of the movement route MR, from the database DB, and sends the illumination lighting command to the in-vehicle communication device 120 of the vehicle 110. In response to the illumination lighting command, the processor 130 of the vehicle 110 lights the illumination device provided on the vehicle body 112 of the vehicle 110. With this configuration, it is possible to brightly illuminate the vicinity of the movement route MR in the parking lot 100, using the illumination device, and therefore, it is possible to further enhance the safety of the user B.

In the above-described step S4, the processor 18 estimates the movement route MR (MR1, MR2, MR3, MR4) along which the user B (B1, B2, B3, B4) moves to the gateway 104B or gateway 104C. However, in step S4, the processor 18 may estimate the movement route MR from the gateway 104B or gateway 104C to the vehicle 110B of the user B.

Specifically, the user B and the vehicle 110B previously perform the user registration, as described above, and therefore the processor 18 can identify the user B and the vehicle 110B of the user B. For example, in the example shown in FIG. 3, when the user B returns to the vehicle 110B from the gateway 104B, the user B operates a parking fee payment device installed in the parking lot 100 (or the commercial facility), and pays the parking fee.

At this time, the user B inputs the personal information PR (for example, an ID number such as a credit card number) about the user B, to the parking fee payment device. The processor 18 acquires the personal information PR input to the parking fee payment device, and collates the personal information PR with the database DB. Thereby, the processor 18 can identify the vehicle 110B of the user B, and therefore can identify the parking space 106 where the vehicle 110B is parked. In step S1, the processor 18 makes the determination of YES when the processor 18 acquires the personal information PR about the user B from the parking fee payment device, and in step S4, the processor 18 estimates the movement route MR to the vehicle 110B based on the user identification data UD.

In the above-described step S5, the processor 18 decides the running route RR along which the vehicle 110A runs from the entrance gate 104A to the parking space 106. However, in step S5, the processor 18 may decide the running route RR from the parking space 106 where the vehicle 110A is parked to an exit gate (not illustrated).

For example, in the example shown in FIG. 3, it is assumed that the vehicle 110A parked at the parking space 106A runs to the exit gate. In this case, in step S2, the processor 18 may detect whether the operation of the vehicle 110A has been started, based on the imaging data IM generated when the infrastructure sensor 12 images the vehicle 110A parked at the parking space 106A, and may make the determination of YES when the operation start is detected.

Then, in step S5, the processor 18 may decide the running route RR from the parking space 106A to the exit gate, so as to avoid the movement route MR of the user B that is estimated in the last step S4, based on the movement direction MD of the user B that is estimated in the last step S4, the position information PI5 about the parking space 106A, the position information PI7 about the exit gate, and the map data MP.

In the above-described embodiment, a restroom 104D, an elevator 104E, an escalator 104F or the like may be provided as the installation 104 available to the user B (B1, B2, B3, B4). Then, in step S4, the processor 18 may estimate the movement route MR (MR1, MR2, MR3, MR4) to the restroom 104D, the elevator 104E or the escalator 104F, based on position information about the restroom 104D, the elevator 104E or the escalator 104F.

The processor 18 of the parking management server 16 may execute the flow shown in FIG. 5 or FIG. 10, in accordance with the computer program PG previously stored in the memory 20. Further, the functions of the parking management device 50 or parking management device 60 (that is, the data acquiring unit 26, the movement route estimating unit 28, the running route deciding unit 30, the sending unit 32 and the priority order giving unit 34) that are executed by the processor 18 may be functional modules that are realized by the computer program PG. The present disclosure has been described above with the embodiment. The above-described embodiment does not limit the disclosure according to the claims.

What is claimed is:

1. A parking management device configured to manage a vehicle in a parking lot,
    the parking management device comprising at least one processor configured to:
        acquire user identification data for identifying a position of a user moving in the parking lot,
        estimate a movement route based on the acquired user identification data, the movement route being a route along which the user moves in the parking lot,
        decide a travelling route of the vehicle so as to avoid the estimated movement route, the vehicle being a vehicle travelling in the parking lot, and parking
        give a priority order to the user based on the acquired user identification data, the priority order corresponding to a physical feature of the user, wherein:
    the at least one processor is further configured to:
        estimate the respective movement routes of a plurality of the users,
        obtain a plurality of candidates of the travelling route, and
        decide that the travelling route is one of the plurality of obtained candidates, the one of the plurality of obtained candidates being a candidate that allows avoidance of the movement route of the user to which the highest priority order is given.

2. A parking management device configured to manage a vehicle in a parking lot,
    the parking management device comprising at least one processor configured to:
        acquire user identification data for identifying a position of a user moving in the parking lot,
        estimate a movement route based on the acquired user identification data, the movement route being a route along which the user moves in the parking lot, and
        decide a travelling route of the vehicle so as to avoid the estimated movement route, the vehicle being a vehicle travelling in the parking lot, wherein:
    the at least one processor is further configured to:
        estimate the respective movement routes of a plurality of the users,
        obtain a plurality of candidates of the travelling route,
        calculate a number of crossing points between each of the plurality of obtained candidates and the plurality of estimated movement routes; and
        decide that the travelling route is one of the candidates, the one of the candidates being a candidate for which the calculated number is smallest.

3. A parking management device configured to manage a vehicle in a parking lot,
    the parking management device comprising at least one processor configured to:
        acquire user identification data for identifying a position of a user moving in the parking lot,
        estimate a movement route based on the acquired user identification data, the movement route being a route along which the user moves in the parking lot, and
        decide a travelling route of the vehicle so as to avoid the estimated movement route, the vehicle being a vehicle travelling in the parking lot, wherein
    a plurality of installations available to the user is provided in the parking lot,
    the at least one processor is further configured to estimate the movement route along which the user moves to an installation among the plurality of installations, based on position information about the installation, in addition to the user identification data, and
    the at least one processor is further configured to estimate the movement route to a closest installation to the user among the plurality of installations.

4. The parking management device according to claim 3, wherein the at least one processor is further configured to send, to the vehicle travelling, the travelling route decided by the at least on processor, wherein
    the vehicle travelling
        autonomously travels by automatic driving, in accordance with the received running route, or
        outputs navigation information that guides a driver along the received travelling route.

5. The parking management device according to claim 3, wherein
    as the user identification data, the at least one processor is further configured to:
        acquire imaging data generated when the user is imaged by an infrastructure sensor provided in the parking lot or a vehicle-exterior monitoring sensor provided in a vehicle in the parking lot, or
        acquire position information about a portable device that is held by the user, from the portable device.

6. The parking management device according to claim 3, wherein the installation includes a gateway through which the user is capable of entering or leaving the parking lot.

7. The parking management device according to claim 3, wherein:
    a travelling direction in which the vehicle travels is previously restricted in the parking lot; and
    the at least one processor is further configured to select one reference route from a plurality of reference routes that is previously set in accordance with the travelling direction, and decides that the travelling route is the one reference route, the one reference route being a route that allows avoidance of the movement route estimated by the at least one processor.

8. A vehicle that autonomously runs by automatic driving, in accordance with the running route decided by the at least one processor of the parking management device according to claim 3, or outputs navigation information that guides a driver along the running route decided by the at least one processor of the parking management device according to claim 3.

* * * * *